United States Patent

[11] 3,595,523

| [72] | Inventor | George A. Felton<br>New South Wales, Australia |
|---|---|---|
| [21] | Appl. No. | 826,043 |
| [22] | Filed | Apr. 14, 1969 |
| [45] | Patented | July 27, 1971 |
| [73] | Assignee | George Robert Embelton<br>New South Wales, Australia<br>a part interest |
| [32] | Priority | Apr. 19, 1968 |
| [33] | | Australia |
| [31] | | 36,623/68 |

[54] PLASTIC BUTTERFLY VALVE HAVING A REINFORCEMENT BLADE
16 Claims, 7 Drawing Figs.

| [52] | U.S. Cl. | 251/306, 251/368 |
|---|---|---|
| [51] | Int. Cl. | F16k 1/226 |
| [50] | Field of Search | 251/305–308, 368 |

[56] References Cited
UNITED STATES PATENTS

| 2,930,574 | 3/1960 | Sebardt | 251/306 X |
| 3,425,439 | 2/1969 | Duffey et al. | 137/375 |
| 3,479,008 | 11/1969 | Duncan | 251/305 X |

Primary Examiner—Henry T. Klinksiek
Attorney—Waters, Roditi, Schwartz & Nissen

ABSTRACT: A butterfly vale which includes a valve body of plastic material, having two separately positioned openings for connection in a pipeline; and a blade which is also constructed substantially from plastic material. The blade is journaled in the housing so as to be rotatable to a position wherein it prevents fluid flow between the openings in the housing. The blade is provided with reinforcement means.

PLASTIC BUTTERFLY VALVE HAVING A REINFORCEMENT BLADE

This invention relates generally to butterfly valves and in particular to a butterfly valve of substantially plastic material construction.

There is a steadily growing industrial demand for plastics pipes. These pipes can offer considerable economic and installation advantages over conventional pipes manufactured from heavier materials. The present invention envisages the provision of a valve constructed mainly of plastic material which will be particularly useful with to the larger diameter plastics pipes. Such a valve will be consistent in price and weight with the pipeline in which it is installed.

In designing a plastic valve suitable for medium to large diameter pipes, the principal problem is to overcome economically the disadvantages of the lower strength properties associated with suitable plastic materials, when compared to the properties of metals used in the construction of conventional valve components.

An object of this invention then is to provide a valve of novel construction to overcome these disadvantages.

According to the invention there is provided a butterfly valve, including a valve body of plastic material, having two separately positioned openings therein for connection in a pipeline, and a substantially plastic material blade journaled in the housing intermediate to the openings so as to be rotatable to a position wherein it provides a closure to prevent fluid flow between the openings, the blade being provided with reinforcement means.

A preferred form of the invention will now be described in detail with reference to the accompanying drawings of which:

FIG. 3 is a slightly inclined end elevation of the valve in part section, while

Figure 1:
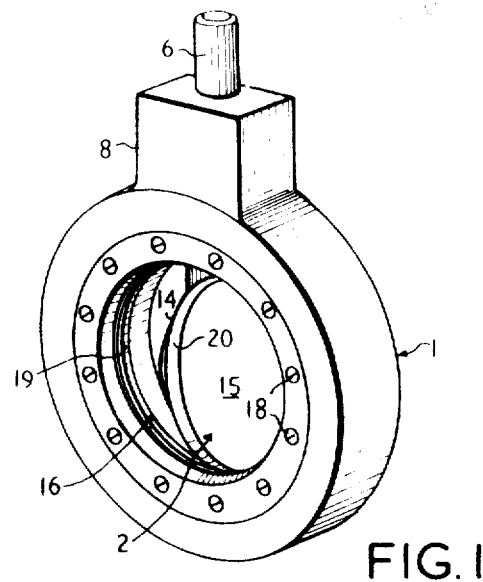
FIG. 1 is a perspective view of the valve in the open position.

It is to be understood that the form of the invention depicted in the drawings is exemplary only. As will become apparent from the description several alternative forms are available.

Particularly it is to be understood that while the ensuing description pertains principally to a valve of the asymmetric kind, the invention is equally applicable to valves of the symmetric kind wherein the axis of pivot of the blade lies on the same plane as the sealing edge of the blade.

The two main components of the valve shown in the drawings are a valve housing denoted generally 1 and a blade denoted generally 2 positioned between openings at either end of the housing. The blade 2 is rotatable to a position wherein it provides a closure between the openings.

Figure 2:
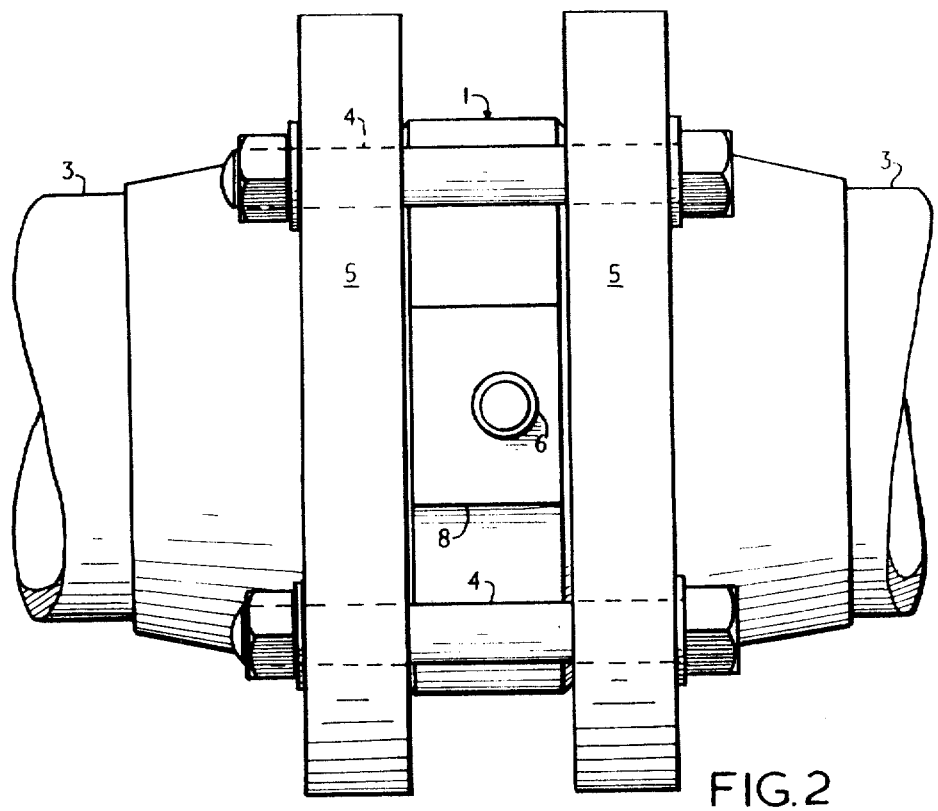
FIG. 2 is a plan view of the valve showing its installation in a pipeline.

The housing is generally cylindrical in external appearance with circular openings at both ends. These openings comprise the inlet to and outlet from the valve when it is connected in a pipeline 3 as shown in FIG. 2.

The valve housing may be of the "flange" variety and then has an annular flange located about each opening with appropriately positioned bolt holes therein for attachment to corresponding flanges formed on the ends of the pipeline. Alternatively as with the form depicted the valve may be a "wafer" valve, and held in position by bolts 4 extending between flanges 5 on the two pipeline ends between which it is connected.

Intermediate the two circular openings in housing 1, the circular valve blade 2 pivots about an axis crossing the longitudinal axis of the valve housing substantially at right angles. The blade is journaled in trunnions which may simply be diametrically opposite circular apertures or wells formed in the sides of the housing centrally of its ends, as will be explained in fuller detail below.

In the embodiment depicted the valve housing is formed in one piece as by injection molding from a suitable plastic material such as Polyvinyl Chloride and the blade 2 is installed by positioning the blade in the housing and inserting metal shaft 6 through premolded cylindrical aperture in the blade.

Alternatively the inside surface of the housing may be circular in section but with diameter decreasing outwardly from the center, slightly at first so that the shape of the inside surface does not restrict the rotation of the circular blade. The housing in this case is molded as two semicylindrical preformed sections of a suitable plastic material. In assembly, the two halves are bonded together after the blade has been properly journaled in its trunnions. Epoxy Resin is a suitable bonding for this operation which is facilitated by tongue and grooving formed on the edges to be joined.

Figure 3:
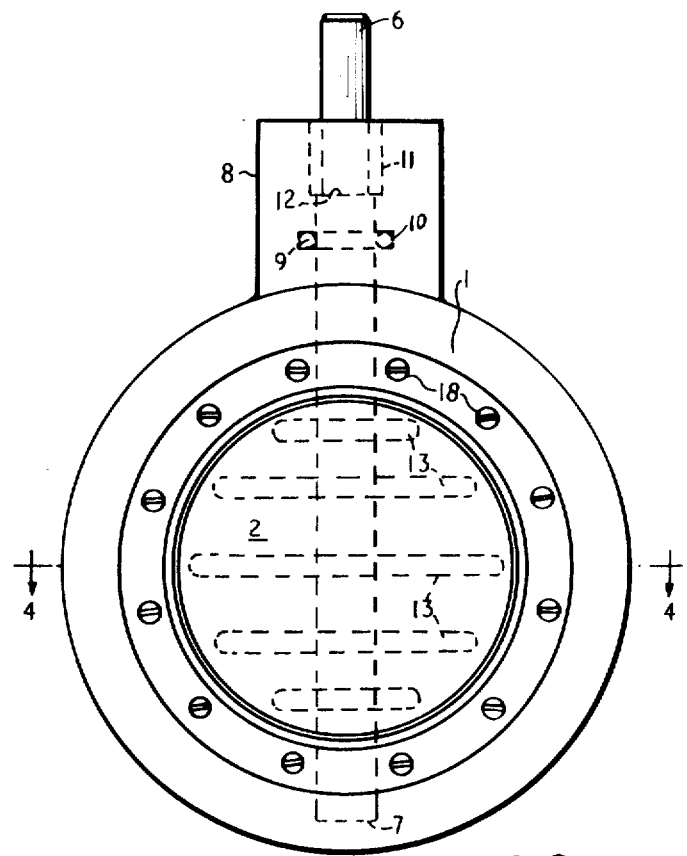

As shown in FIG. 3 the shaft 6 is located at its lower extremity in trunnion 7 which is no more than a well or socket in the side of the housing. At its upper extremity shaft 6 rotates in trunnion 8, formed outwardly of the diametrically opposite side of the housing to trunnion 7. An annular recess 9 is formed in trunnion 8 and in this is located a ring seal 10 bearing on shaft 6. The ring seal may suitably be of rubber.

The upper portion of shaft 6 is of reduced diameter as shown in FIG. 3. After shaft 6 has been positioned in housing 2 a thrust collar 11 is mounted within the trunnion 8 so as to bear on neck 12 between the reduced diameter portion of shaft 6 and the remainder thereof. Thrust collar 11 ensures that the correct longitudinal positioning of shaft 6 is maintained. Shaft 6 protrudes a short distance from trunnion 8 to allow positioning of turning means.

As an alternative to the preferred embodiment the blade might be formed with diametrically opposite coaxial cylindrical bearing arms of diameter only very slightly less than the inside diameters of the trunnions. These arms would be positioned inside the trunnions and the blade would pivot thereon. It will be appreciated that this embodiment would necessitate molding of the housing in two sections as outlined above. A metal shaft similar to shaft 6 would then be provided as a reinforcement member, retained along the axis of pivot of the blade. The shaft would be preferably of square cross section. One end of the shaft would terminate flush with the face of the lower bearing arm, while the other would protrude a short distance from the face of the other. Such a protrusion would allow positioning of a turning handle.

The blade 2 is generally disc shaped with diameter only slightly less than the adjacent inside diameter of the housing 1 so that it may be rotated to substantially cover the cross section of the housing. The blade is of a plastic material except for the presence of metal reinforcement members 13 bonded therein. There may be one or more of such members. Typically there are 5 as shown in the drawings.

Figure 4:
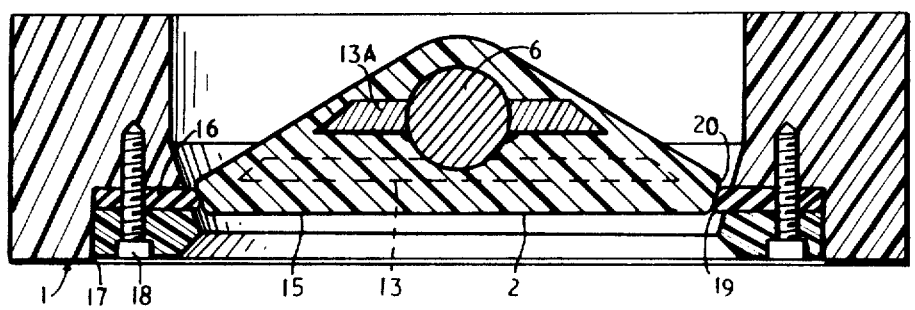
FIG. 4 is a sectional view taken along line 4—4 of FIG. 3.

It will be noted from FIG. 4 that the blade 2 is asymmetric that one face 14 of the blade is closer to shaft 6 than the other face 15. Face 15 is substantially planar. Face 14 on the other hand is generally convex or conical but has a segmental cylindrical embossment or protuberance therealong around shaft 6.

Metal reinforcement members 13 are located in apertures in shaft 6 and a premolded longitudinal recess through blade 2. The reinforcement members extend across the blade almost to its edges. The outer unfilled extremities of the longitudinal recess in which the member is positioned are completed with a plastic material and/or bonding agent.

In an alternative form of the invention (not shown) the reinforcement members are provided with terminal thread and nut means or some other compressing device so as to effectively prestress the blade.

It should be noted that the cross-sectional shape of the reinforcement members is not of great importance. They may be of circular section (as depicted) of square section or of any other cross-sectional shape.

Further reinforcing arrangements are possible:

a. the reinforcement may be a flat plane embedded within the blade, for example it might be a metal disc secured to blade 6 by any convenient means such as screws or pins. A disc 13A welded to shaft 6 is indicated in broken line in FIG. 4.

b. the reinforcement may be a metal latticework, or metal mesh.

c. the reinforcement may consist of glass or carbon fibers; these may be used alone or in conjunction with other types of reinforcement mentioned.

With most of the above alternatives the reinforcement may be either positioned during molding of the blade, or as will more usually be the case inserted in preformed recesses in the molded blade.

In the preferred embodiment the seal between the housing 1 and the blade 2 is attained by means of a flat annular sealing ring 16 of rubber or other suitable flexible material. Sealing ring 16 is seated on a recessed annular ledge on housing 2 and maintained in this position by a retaining ring 17 of a plastic material. Retaining ring 17 is mounted to housing 2 by means of a plurality of screws 18.

The inwardly disposed edge 19 of sealing ring 16 abuts in the closed position against the outwardly disposed peripheral edge 20 of blade 2. It will be noted from FIG. 4 that edge 20 is somewhat slanted, the diameter of the blade increasing from face 15 to face 14. The edge 19 of sealing ring 16 is at a slant consistent with that of edge 20. Preferably however both edges are also somewhat rounded so as to prevent scuffing on opening and closing of the valve.

As previously noted the housing is generally cylindrical in outward appearance. The inside surface of the housing is also generally cylindrical, however in the vicinity of seal 16 the housing is of slightly reduced inside diameter, the surface slanting somewhat, following the slant in edge 19 of sealing ring 16 and edge 20 of blade 2.

Accordingly if, in the closed position, the liquid pressure is on surface 15 of the blade, the pressure as applied in the channel between the inside surface of the housing and the edge 20 of the blade will tend to force the seal 16 against the blade 2, thus ensuring better closure.

In a further alternative to the preferred embodiment the seal may be provided not on the housing but on the periphery of the blade.

As a further alternative still the sealing may be attained through incorporation of a molded-in resilient liner of rubber or other suitable material. With such an embodiment it will be appreciated that the blade would be preferably of the symmetric kind.

Figure 5:
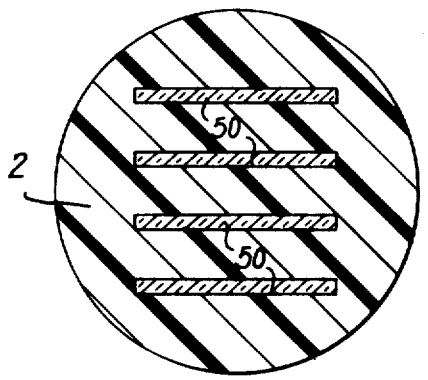
FIG. 5 is a front view of the blade with glass filaments therein.
Figure 6:
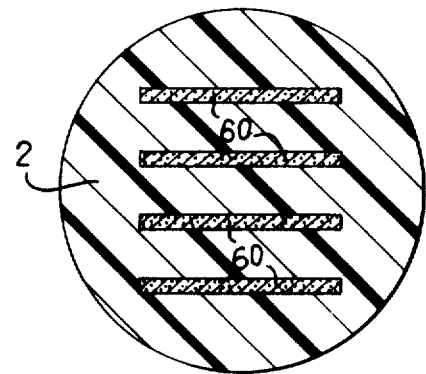
FIG. 6 is a front view of the blade with carbon filaments therein.
Figure 7:
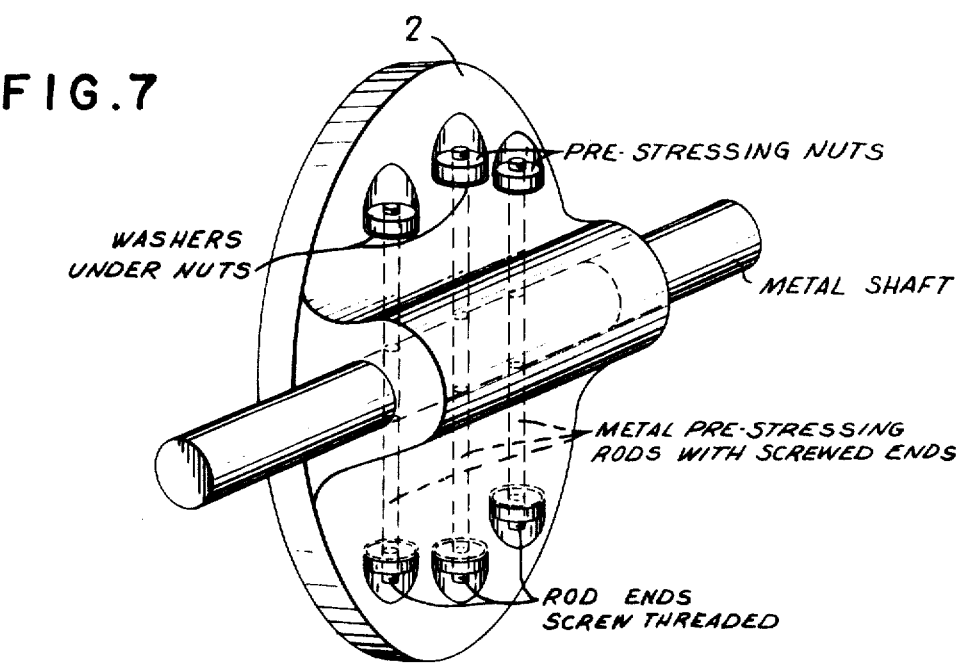
FIG. 7 is a view illustrating the blade being prestressed.

FIGS. 5 and 6 illustrate the blade 2 having glass filaments 50 and carbon filaments 60, respectively embedded therein.

I claim:

1. A butterfly valve including:
a. A valve body mostly of a plastic material, having two separately positioned openings therein for connection to a pipeline;
b. A blade having two surfaces, said blade being constructed mainly of plastic materials and journaled in said housing between said openings to be rotatable to a closed position preventing fluid flow between said openings, and having an axis of rotation;
c. an axial metal member disposed along the axis of rotation of the blade and secured thereto for rotation therewith; and
d. at least two transverse reinforcement members within said blade extending transversely of said axial member toward the lateral edges of the blade.

2. A valve according to claim 1 wherein said axial member is provided with apertures, said transverse reinforcement members being located in said apertures in said axial member.

3. A valve according to claim 2 wherein at least one of said transverse reinforcement members is provided with means for prestressing said blade.

4. A valve according to claim 3 wherein said means for prestressing said blade include terminal thread and nuts on respective transverse reinforcement members.

5. A valve according to claim 2 wherein said axial member rotates in trunnions positioned in the sides of said housing, the extremities of said axial member protruding from said blade into said trunnions to form cylindrical bearing arms.

6. A valve according to claim 5 wherein said trunnions are diametrically oppositely located in said housing, said housing being of substantially circular cross section.

7. A valve according to claim 5 wherein a first of said trunnions is a cylindrical well in the inside surface of said housing and the second of said trunnions is a cylindrical orifice in the side of said housing, said axial member protruding through said orifice.

8. A valve according to claim 7 wherein an outermost portion of said axial member in said second trunnion is of reduced diameter, and said second trunnion includes a thrust collar located about said portion of reduced diameter to restrict longitudinal movement of said axial member.

9. A valve according to claim 2 including annular sealing means operable between said housing and the perimeter of said blade.

10. A valve according to claim 9 wherein said sealing means is a flat annular ring located on the inner surface of said housing.

11. A valve according to claim 10 wherein said flat annular ring is located on an annular recessed ledge disposed toward one extremity of said housing and retained therein by an annular retaining ring.

12. A valve according to claim 9 wherein the coacting periphery of said blade and edge of said seal have an outward slant away from the upstream side of said valve.

13. A valve according to claim 12 wherein the inside surface of said valve in the vicinity of said sealing means has an outward slant away from the upstream side of said valve.

14. A valve according to claim 9 wherein the coacting edges of said sealing means and said blade are slightly rounded to diminish scuffing therebetween.

15. A valve according to claim 1 wherein said transverse reinforcement members comprise glass filaments located within said blade.

16. A valve according to claim 1 wherein said transverse reinforcement members comprise carbon filaments located within said blade.